United States Patent

[11] 3,614,421

| [72] | Inventors | Henry Ward Alter;<br>Richard S. Gilbert, both of Danville, Calif. |
|---|---|---|
| [21] | Appl. No. | 783,247 |
| [22] | Filed | Dec. 12, 1968 |
| [45] | Patented | Oct. 19, 1971 |
| [73] | Assignee | General Electric Company |

[54] AMBIENT RADIOACTIVITY AIR FILTER TESTER USING A TRACK-REGISTRATION MATERIAL
7 Claims, 3 Drawing Figs.

[52] U.S. Cl.................................................. 250/43.5,
250/44, 250/83, 250/83.6, 250/106, 356/207
[51] Int. Cl........................................................ G01t 1/08,
G01t 1/20
[50] Field of Search............................................ 250/43.5 R,
44, 83.6 T, 106 T; 356/207

[56] References Cited
UNITED STATES PATENTS
| 2,892,091 | 6/1959 | Sawle ........................... | 250/43.5 R |
| 3,373,683 | 3/1968 | Alter............................. | 250/83 CD |
| 3,473,876 | 10/1969 | Steinberg ..................... | 356/207 |

*Primary Examiner*—James W. Lawrence
*Assistant Examiner*—Morton J. Frome
*Attorneys*—Ivor J. James, Jr., Samuel E. Turner, John R. Duncan, Frank L. Neuhauser, Oscar B. Waddell and Melvin M. Goldenberg ABSTRACT: An improved technique for testing air filtration systems is disclosed. So-called "absolute" filters are intended to remove substantially suspended particles from a stream of air passing therethrough. Track-registration films sensitive to alpha particles emitted by radon daughters are placed upstream and downstream of the high-efficiency filter banks. After a suitable period, the exposed films are developed. The ratio of downstream to upstream track density is a direct measure of filtering efficiency. This system is much more sensitive, convenient and simple than prior filter-efficiency-testing techniques.

3,614,421
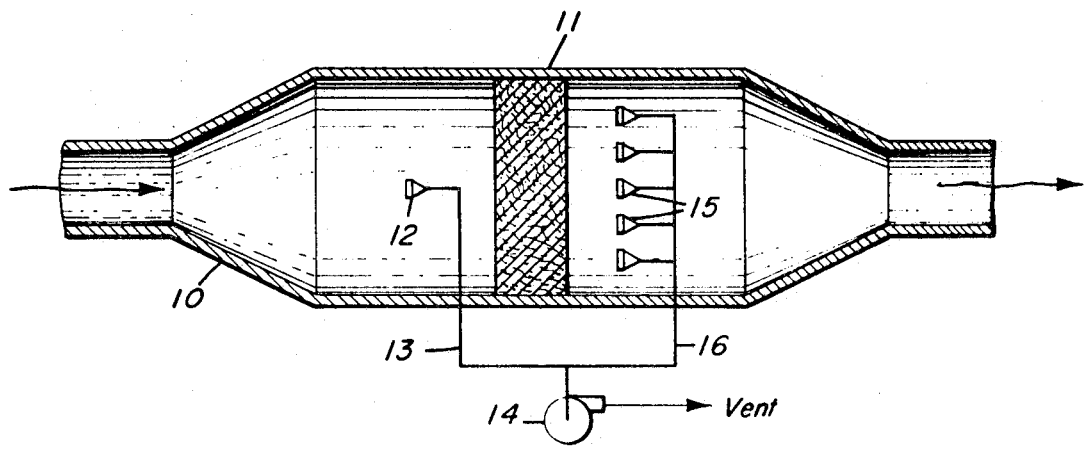
Fig. 1
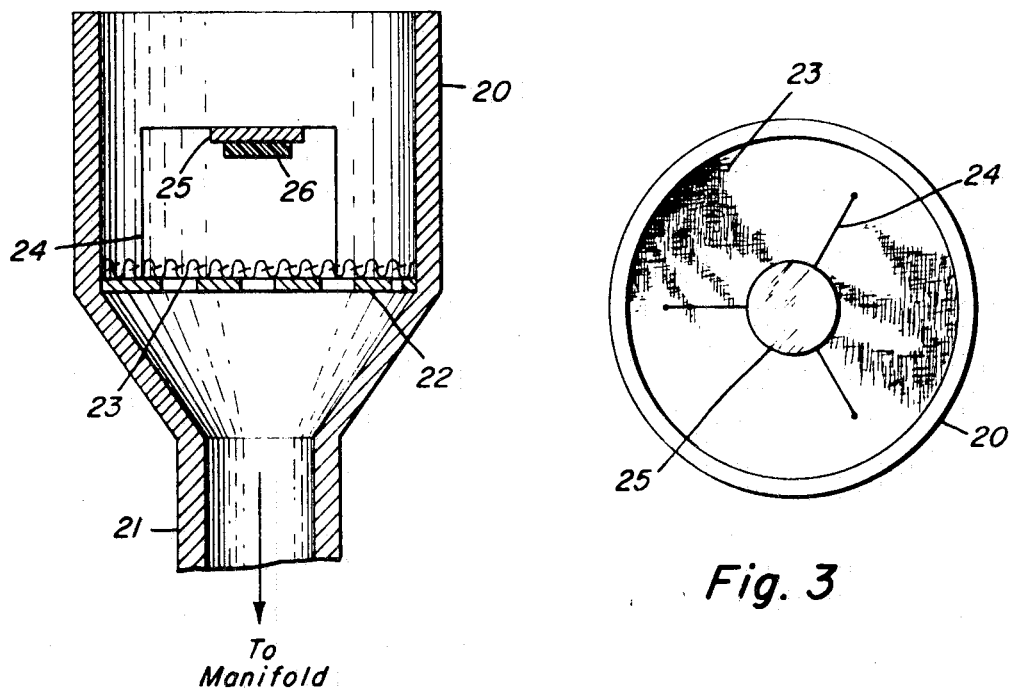
Fig. 2
Fig. 3
INVENTORS:
HENRY WARD ALTER
RICHARD S. GILBERT
BY: *John R. Rluman*
ATTORNEY

AMBIENT RADIOACTIVITY AIR FILTER TESTER USING A TRACK-REGISTRATION MATERIAL

BACKGROUND OF THE INVENTION

A wide variety of filter systems have been developed to remove finely divided particulate material from airstreams. In environments such as the "clean rooms" used for the assembly of complex and delicate mechanisms, it is essential that substantially all suspended particulates be removed from the air in the room. This problem is especially acute in the nuclear industry since the particles are often dangerously radioactive. For example, the off-gas from a nuclear reactor must be as clean as possible before passing to the discharged stack. It is essential that the air in laboratories handling highly radioactive materials, especially plutonium, be free of suspended radioactive particles.

A wide variety of filtering systems have been developed. Typical filtering systems use electrostatic precipitators, liquid-gas contact devices, etc. The most effective known method of thoroughly removing particles within the 0.01 to 1-micron range is to pass the gas stream through a so-called "absolute" filter, which is simply a physical filter fine enough and thick enough to trap the particles. When operated properly and free of leaks, these filtering systems are generally effective. However, leaks may occur in the filtering system due to improper installation and sealing, actual breaks in the filter material or poor specification material.

Several tests are in use to detect leaks and other failures of the filtering system. The most sensitive standard test at present is to introduce an aerosol of dioctylphthalate droplets upstream of the filter assembly and monitor aerosol concentration downstream with a light-scattering photometer. While this method can measure penetration values of less than 0.03 percent, it is cumbersome in that for large air-handling systems large aerosol generation and sampling/analysis stations must be provided. Also, the use of much dioctylphthalate will tend to clog and shorten the useful life of the filter. Thus, the aerosol technique may only be used intermittently to avoid undesirably degrading filter performance.

Attempts have been made to measure filter efficiency by collecting radon daughters on glass filter discs upstream and downstream of the filter assembly. The filters are beta counted for radon daughters. However, it has been found that this technique is only sensitive down to penetrations of about 1 percent, although it is in excellent agreement with the results of the aerosol technique at 1 percent and above.

It is of utmost importance that incipient leaks and other failures of the filter assembly be detected as early as possible. In a clean room environment, the products produced, such as delicate mechanisms, drugs, etc., may be contaminated where undetected leaks in the filtering system occur. In the nuclear industry, an undetected leak may release dangerous quantities of radioactive material to the environment.

Thus, there is a continuing need for filter-testing techniques of improved sensitivity and reliability.

SUMMARY OF THE INVENTION

It is, therefore, an object of this invention to provide an improved fluid filter-testing technique.

Another object of this invention is to provide a fluid filter-testing technique which does not adversely affect the filter.

Another object of this invention is to provide a fluid filter-testing technique of improved sensitivity and reliability.

Still another object of this invention is to provide a fluid filter-testing technique which may be used to continuously test a filter assembly.

The above objects, and others, are accomplished in accordance with this invention by providing a fluid filter-testing technique wherein alpha-particle-sensitive track registration materials are exposed to radon daughters upstream and downstream of the filter assembly. Upon development of the damage tracks formed in the track registration material by incident alpha particles, the ratio of downstream to upstream track densities may be determined. This ratio is a direct measure of filter efficiency. This system adds no foreign material to the airstream passing through the filter assembly. The filter assembly may be continuously or intermittently monitored by this technique, as desired.

Recently, it has been found that the alpha particles emitted during the decay of radon daughters will form damage tracks of altered material along their trajectories in certain track registration materials. This phenomenon and certain applications thereof are disclosed in copending U.S. Pat. application Ser. No. 654,631, now abandoned filed July 19, 1967 and copending U.S. Pat. application Ser. No. 787,431, filed Dec. 27, 1968.

It has now been found that this track-registration technique is surprisingly effective in measuring the efficiency of filter systems due to the extraordinary ability of these materials to differentiate between different quantities of radon daughters in a gas stream and the ability to detect extraordinarily small quantities of radon daughters in the gas stream.

BRIEF DESCRIPTION OF THE DRAWING

Details of the invention and of a preferred embodiment thereof will be further understood upon reference to the drawings, wherein:

FIG. 1 shows a schematic representation of a horizontal section through an air-filter-testing system according to this invention;

FIG. 2 shows a schematic representation of a typical sampling station in elevation; and FIG. 3 shows a plan view of the typical sampling station shown in FIG. 2.

DETAILED DESCRIPTION OF THE INVENTION

Referring now to FIG. 1, there is seen a conduit 10 through which the gas stream being filtered passes. A filter bank 11 is mounted in conduit 10 so that the gas stream passes entirely through the filter. The concentration of radon daughters in the entering gas stream is measured by an upstream sampling station 12 mounted upstream of filter 11. Gas is pulled through sampling station 12 and passes through tube 13 to a vacuum pump 14. A plurality of downstream sampling units 15 are located immediately downstream of filter 11. Gases are pulled through sampling units 15 by means of pump 14 connected to the sampling units through tubes 16. Gas-exiting pump 14 may be directed to a vent or may be returned to conduit 10 upstream of filter 11, as desired.

While the gross efficiency of filter 11 could be measured by a single upstream and a single downstream sampling unit, it is preferred that a plurality of downstream sampling units 15 be used spaced adjacent filter 11. With the plural sampling units, the location of a leak in filter unit 11 may be determined by the location of the downstream sampling unit 15 which detects excessive radon or radon daughters.

FIGS. 2 and 3 show a typical sampling station which may be used to hold track registration material in the desired location. While that shown is preferred any other suitable holder may be used as desired. As seen in FIG. 2, the sampling station consists of an open-ended sleeve 20 connected to an outlet tube 21 which is in turn connected to the vacuum pump or other suction means. A perforated plate 22 within sleeve 20 supports a membrane filter 23 which will retain alpha-active radon daughters. A three-legged support means 24 stands on perforated plate 22. Support means 24 holds a disc 25 within sleeve 20 spaced from membrane filter 23. A piece of track registration material 26 is secured to disk 25 facing filter 23. Thus, the track registration material 26 is not directly exposed to the airstream. This will aid in preventing large particles of material which may be in the gas stream, especially at upstream station 12, from depositing on the surface of track registration material 26. Track registration material 26 may be secured to disc 25 by any suitable means. Typically, a pressure-sensitive material such as transparent tape coated on both sides may be used. Of course, if desired, any other holding or clamping means may be used.

The track registration material 26 is spaced from membrane filters 23 a distance less than the transit range of alpha particles in air, which is generally about 7—10 centimeters. Thus, as radon daughters are caught on membrane filter 23 and decay, emitted alpha particles reach material 26 and form damage tracks therein.

As can be seen, this system is extremely simple and reliable. No foreign material is added to the gas stream since the radon daughters are inherently present in usual gas streams. Also, no physical contact is made with the filter medium and the small sampling stations in the airstream do not significantly hinder gas flow through conduit 10.

Any suitable track registration material which forms damage tracks of altered material along the trajectory of alpha particles in the material may be used to detect the presence of radon and radon daughters upstream and downstream of filter 11. Cellulosic materials, such as cellulose nitrate and cellulose acetate, have been found to form alpha particle damage tracks having excellent developing characteristics when treated with the etching solution. These, therefore, are preferred track registration materials for use in the system of this invention. The track registration material may be in the form of a self-supporting sheet or may be in the form of a film coated on a base material such as a metal, glass, or plastic, as desired. While any suitable thickness of track registration material may be used, it is generally preferred that the material have a thickness of at least 20 microns so that substantially the full length of the trajectory of an alpha particle is recorded in the material.

Tracks formed by alpha particles may be developed in this track registration material by any suitable technique. Typically, the irradiated sheet of track registration material is immersed in an etching solution which preferentially attacks the damaged material along the alpha particle trajectories. Typical etchants include sodium hydroxide, potassium hydroxide, ammonium hydroxide, sodium carbonate, and mixtures thereof. Of these, in general best results are obtained with about 6-normal sodium hydroxide. The sheet may be left in the etching solution for any suitable time period. Where the period is too short, the tracks will not be readily visible, while too long a treating period allows the solution to attack the body of the sheet excessively. The temperature of the treating solution has a major effect on rapidity of etching. Typically, a cellulose nitrate track registration sheet treated with 6-normal sodium hydroxide gives best results in about 35 minutes at about 40° C. At room temperature, several hours may be required to give similar results.

The following examples described in further detail several preferred embodiments of the filter-testing system of this invention. Parts and percentages are by weight unless otherwise indicated.

Example I

A high efficiency filter, available from the Mine Safety Appliance Company, is installed in a conduct having a cross-sectional area of about 600 square inches. Means are provided to pass an airstream through the conduit at about 1,000 cubic feet per minute. On the upstream side of the filter, the sampling station of the sort shown in FIGS. 2 and 3 is installed. Downstream of the filter, four sampling stations are installed, equally spaced across the conduit about 30 inches from the filter. Each sample station includes a sheet of "Nuclepore" membrane filter material available from the General Electric Company, prepared as described in U.S. Pat. No. 3,303,085, having an average pore size of about 0.8 micron. The filter material is supported on a perforated plastic disc. A disc of cellulose nitrate film having a thickness of about 20 microns and a diameter of about 0.5 inch is spaced about 0.5 inch from the filter material, as shown in FIG. 2. The experimental assembly is installed and air is passed through the conduit for about 16 hours. Each of the cellulose nitrate discs is removed and placed in a solution of 6-normal sodium hydroxide at a temperature of about 40° C. for about 35 minutes. Each of the discs is then examined with a microscope and the number of etched tracks formed per square centimeter is determined. The disc from the upstream sample holder is found to have about $6 \times 10^4$ tracks per square centimeter. This is representative of the quantity of radon daughters ordinarily present in the atmosphere. Each of the discs from the downstream sampling stations is found to have about 10 tracks per square centimeter. This indicates that the filter is operating efficiently and that the filtering characteristics are uniform across the filter.

Example II

The experiment of example I is repeated except that the filter is deliberately not securely fastened to the conduit along one wall thereof. This permits a small amount of air to bypass the filter between the conduit wall and the edge of the filter. After air has been passed through the system for 16 hours, the cellulose nitrate discs are removed and developed as described above. Again, the disc from the upstream sampling station is found to have about $6 \times 10^4$ tracks per square centimeter. The discs from the downstream stations which are relatively remote from the unfastened edge of the filter show about 10 tracks per square centimeter. This indicates that the filter is operating effectively in these areas. However, the discs from the sampling stations adjacent the unfastened edge shown about 1,000 tracks per square centimeter. This is a clear indication of a defect in the filter in this area. Also, the number of tracks indicates the severity of the leak.

Example III

An "absolute" filter, is installed in a conduit having a cross-sectional area of about 800 square inches. Means are provided for flowing off-gas from a nuclear reactor of the boiling water type through the conduit. An array of sampling stations such as is shown in FIG. 1 is installed with one sampling station upstream of the filter assembly and a plurality of sampling stations downstream of the filter assembly, each downstream station spaced about 3 inches from the filter. Each sampling station includes a piece of Millipore membrane filter material, available from the Millipore Corporation, having an average pore size of about 5 microns. A disc of cellulose acetate film having a thickness of about 30 microns and a diameter of about 0.5 inch is squared about 0.5 inch from the filter surface, as shown in FIG. 2. Reactor off-gas is passed through the filter system at a rate of about 100 cubic feet per minute for about 24 hours. This gas includes oxygen and hydrogen radiolytically formed in the reactor, and small amounts of a variety of fission product gases including xenon, krypton, etc. At the conclusion of the flow test, the cellulose acetate discs are removed and developed in a 5-normal potassium hydroxide solution at about 50° C. for about 2 hours. Each disc is then examined under a microscope and the number of tracks in a 1-square-centimeter area counted. Since the cellulosic material is responsive only to alpha particles, no tracks are produced by gamma and beta radiation which may reach the cellulose acetate sheet from other decaying isotopes which may be present in the gas stream. The disc from the upstream sampling station is found to have about $8 \times 10^4$ tracks per square centimeter. The discs from each of the downstream sampling stations are found to have about 10 tracks per square centimeter. This indicates that the filter is effective in removing the alpha particle producing materials from the gas stream. Since the number of tracks found on each disc from the different sampling stations across the filter is substantially uniform, the filter has substantially uniform efficiency.

Example IV

The experiment of example III is repeated except that several defects are created in the filter by pushing a 1¼-inchdiameter steel rod partially through the filter in several locations and removing it. After the cellulose acetate discs are exposed and developed, as described above, the number of tracks per square centimeter is measured on each disc. Again, the upstream disc is found to have about $8 \times 10^4$ tracks per square centimeter. The discs from downstream stations relatively remote from the damaged areas are found to have about 10 tracks per square centimeter. This indicates that the filter is operating with good efficiency in these areas. Moreover, the discs from sampling stations adjacent the damaged areas are found to have from about $10^3$ to about $10^4$ tracks per square centimeter. This clearly indicates that the filter is defective in these areas and is permitting an undesirably large amount of the materials being filtered to pass through.

Although specific components, assemblies and proportions have been described in the above examples, the other suitable materials and arrangements as indicated above may be used with similar results. In addition, other materials may be added to the track registration sheets, developing solutions, etc. to enhance or otherwise modify their properties.

Other modifications and applications of the present invention will occur to those skilled in the art upon reading this disclosure. These are intended to be included within the scope of this invention.

We claim:

1. A method of monitoring filtration systems which comprises:
   a. making sampling station comprising an open-ended sleeve holding a high-efficiency filter means for retaining alpha active radon daughters from a gas stream drawn through the sleeve and a piece of a track registration material shielded from direct exposure to the gas stream being drawn through the sleeve and spaced from the high-efficiency filter means a distance less than the transit range of alpha particles in air, the material being substantially insensitive to light, beta radiation and gamma radiation, and having the property of forming damage tracks along paths in said material traversed by alpha particles;
   b. positioning at least one sampling station upstream and at least one sampling station downstream of said filter assembly;
   c. flowing the gas stream to be filtered past said filter and sampling stations;
   d. removing said track registration material from said stations and
   e. developing said track registration material with a reagent which selectively attacks and enlarges the damage tracks whereby the tracks are made sufficiently visible to be counted and the difference in number of tracks per unit area at the upstream and downstream sampling stations indicates the effectiveness of the filter.

2. The method according to claim 1 wherein at each sampling station a portion of said gas stream is passed through a high-efficiency filter means spaced adjacent the track registration material whereby alpha-particle-emitting materials in said gas stream are held on said high-efficiency filter and a substantial portion of the alpha particles emitted by said alpha-particle-emitting materials reach said track registration material.

3. The method of claim 1 wherein said track registration material comprises cellulose nitrate.

4. A system for monitoring filtration system which comprises at least one sampling station located upstream of a filter assembly, at least one sampling station the sampling stations comprising an open-ended sleeve holding a high-efficiency filter means for retaining alpha active radon daughters from a gas stream drawn through the sleeve and a piece of track registration material shielded from direct exposure to the gas stream being drawn through the sleeve and spaced from the high-efficiency filter means a distance less than the transit range of alpha particles in air, located downstream of said filter assembly, means to flow the gas stream to be filtered past said filter and sampling stations, means to draw a portion of said gas stream through said high-efficiency filter means, and means to support said track registration material adjacent said high-efficiency filter means.

5. The system according to claim 4 wherein a plurality of said sampling stations are positioned downstream of said filter assembly substantially uniformly spaced across the downstream face of said filter assembly and from about 3 to about 30 inches from said surface of said filter assembly.

6. The system according to claim 4 wherein each sampling station comprises a conduit; suction means connecting one end of said conduit to a region at lower pressure than said gas stream whereby said gas stream surrounding said station flows into and through said conduit; a high-efficiency filter at the other end of said conduit and means to support a sheet of track registration material adjacent said high-efficiency filter.

7. The system according to claim 4 wherein said track registration material comprises cellulose nitrate.